United States Patent [19]
Chan

[11] Patent Number: 5,974,240
[45] Date of Patent: Oct. 26, 1999

[54] METHOD AND SYSTEM FOR BUFFERING CONDITION CODE DATA IN A DATA PROCESSING SYSTEM HAVING OUT-OF-ORDER AND SPECULATIVE INSTRUCTION EXECUTION

[75] Inventor: Kin Shing Chan, Austin, Tex.

[73] Assignee: International Business Machines Corporation, Armonk, N.Y.

[21] Appl. No.: 08/480,999

[22] Filed: Jun. 7, 1995

[51] Int. Cl.[6] .................................................. G06F 9/38
[52] U.S. Cl. ........................ 395/394; 395/391; 395/393; 395/582; 395/583; 395/800.23
[58] Field of Search .................... 395/375, 800, 395/391, 390–395, 496, 376, 595, 800.23, 800.32, 800.41, 800.42

[56] References Cited

U.S. PATENT DOCUMENTS

| | | | |
|---|---|---|---|
| 4,901,233 | 2/1990 | Liptay | 395/394 |
| 5,134,561 | 7/1992 | Laptay | 711/164 |
| 5,261,071 | 11/1993 | Lyon | 711/140 |
| 5,313,634 | 5/1994 | Eickemeyer | 395/587 |
| 5,452,426 | 9/1995 | Papworth et al. | 395/393 |
| 5,463,745 | 10/1995 | Vidwans et al. | 395/394 |
| 5,481,683 | 1/1996 | Karim | 395/393 |
| 5,491,829 | 2/1996 | Kau et al. | 395/800.23 |
| 5,500,943 | 3/1996 | Ho et al. | 395/394 |
| 5,517,657 | 5/1996 | Rodgers et al. | 395/800.42 |
| 5,524,263 | 6/1996 | Griffth et al. | 395/800.23 |
| 5,535,346 | 7/1996 | Thomas, Jr. | 395/393 |
| 5,615,385 | 3/1997 | Fetterman et al. | 395/800.23 |
| 5,655,141 | 8/1997 | Ogden et al. | 395/800.23 |
| 5,664,215 | 9/1997 | Burgess et al. | 395/800.23 |

OTHER PUBLICATIONS

IBM Technical Disclosure Bulletin, vol. 36, No. 12. Dec. 1993, pp. 555–557.
PowerPC 603 RISC Microprocessor User's Manual © 1994, pp. 8–9 thru 8–10.

*Primary Examiner*—Parshotam S. Lall
*Assistant Examiner*—Bharat Barot
*Attorney, Agent, or Firm*—Anthony V.S. England; Andrew J. Dillon

[57] ABSTRACT

In response to dispatching a condition register modifying instruction to an execution unit, a condition register rename buffer is associated with such a condition register modifying instruction. The instruction is then executed in the execution unit. Following the execution of the condition register modifying instruction, condition register data is set in the condition register rename buffer to reflect the result of such instruction execution. Additionally, an indicator is set to indicate the condition register data is valid. At the time for completing the condition register modifying instruction, the condition register data is transferred from the condition register rename buffer to the architected condition register, thereby permitting condition register modifying instructions to be dispatched, executed, and finished before the condition register is available to complete each condition register modifying instruction.

10 Claims, 7 Drawing Sheets

METHOD AND SYSTEM FOR BUFFERING CONDITION CODE DATA IN A DATA PROCESSING SYSTEM HAVING OUT-OF-ORDER AND SPECULATIVE INSTRUCTION EXECUTION

BACKGROUND OF THE INVENTION

1. Technical Field

The present invention relates in general to an improved data processing system, and in particular to a method and system for temporarily buffering condition register data within the data processing system. Still more particularly, the present invention relates to a method and system for temporarily buffering condition register data in a condition register renaming table having a plurality of condition register rename buffers for facilitating out-of-order and speculative instruction execution within a data processing system.

2. Description of the Related Art

As the quest for greater data processing system performance continues, central processing unit (CPU) designers have implemented superscalar data processing systems that are capable of issuing multiple independent instructions into multiple execution pipelines, wherein multiple instructions are executed in parallel. An example of such a superscalar data processing system is the superscalar microprocessor sold under the trademark "PowerPC" by IBM Microelectronics and Motorola Semiconductor. The "PowerPC" architecture is described in more detail in various user's manuals, including "PowerPC 603-RISC MICROPROCESSOR USER'S MANUAL," copyright 1994, IBM Part No. MPR603UMU-01.

Within the superscalar microprocessor, instructions are fetched from an instruction cache and dispatched in program order to one of a plurality of execution units, wherein the instruction is executed by an execution unit appropriate for the particular type of instruction. For example, floating-point instructions are dispatched to one or more floating-point execution units, while fixed-point instructions are dispatched to one or more integer units. While instructions are dispatched in program order, instruction execution may occur out of order, depending upon availability of execution units and other data processing system resources.

In the superscalar processor, instructions may be dispatched, executed, and "finished" before other instructions that were previously dispatched. In order to prevent out-of-order instruction execution from placing data in an architected register at the wrong time, instruction execution is "completed" in program order by a completion unit. Thus, a subsequently dispatched instruction may "finish" before a previously dispatched instruction finishes, but the subsequently dispatched instruction may not be "completed" before completion of the previously dispatched instruction.

As is known in the art, "PowerPC" includes a condition register (CR) that includes bit fields that are set or reset to reflect the results of certain operations, such as move, integer and floating-point compare, arithmetic, and logical operations, and provides a mechanism for testing and branching. A problem occurs, however, when a condition register data dependent instruction (i.e., an instruction that is dependent upon current data being in the condition register) is executed following out-of-order execution of prior instructions that modify data in the condition register.

In the prior art, dispatch of a condition register modifying instruction may be delayed because too many instructions that modify this same condition register cannot be dispatched in the same cycle.

In addition to the problem of dispatching too many condition register modifying instructions in one cycle, branch instructions that depend on data in the condition register (e.g., conditional branch instructions) may be delayed due to the delay in dispatching condition register modifying instructions. If the resolution of such conditional branch instructions is delayed, processing may be further delayed because of the time required to fetch instructions in the new path from instruction memory once the conditional branch instructions is resolved.

In addition to out-of-order execution, superscalar data processing systems may speculatively execute instructions following a conditional branch, if such conditional branch has not been resolved. Such speculative execution causes problems when a conditional branch is speculatively resolved to execute instructions in what is later determined to be the wrong instruction path. When such missprediction of a conditional branch occurs, registers must be restored to the state that existed before misspredicting the condition branch. For example, the condition code register must be restored to the state that existed before executing condition register modifying instructions in the misspredicted branch.

In view of the discussion above, it should be apparent to those persons of ordinary skill in the art that a need exists for a method and system that permits dispatching of multiple condition register modifying instructions in the same cycle, early resolution of condition register data dependent instructions, and efficient cancellation of condition register data resulting from erroneous speculative execution of condition register modifying instructions.

SUMMARY OF THE INVENTION

It is therefore one object of the present invention to provide an improved data processing system.

It is another object of the present invention to provide a method and system for temporarily buffering condition registered data within the data processing system.

It is yet another object of the present invention to provide to a method and system for temporarily buffering condition registered data in a condition register renaming table having a plurality of condition register rename buffers for facilitating out-of-order and speculative instruction execution within a data processing system.

The foregoing objects are achieved as is now described. In response to dispatching a condition register modifying instruction to an execution unit, a condition register rename buffer is associated with such a condition register modifying instruction. The instruction is then executed in the execution unit. Following the execution of the condition register modifying instruction, condition register data is set in the condition register rename buffer to reflect the result of such instruction execution. Additionally, an indicator is set to indicate the condition register data is valid. At the time for completing the condition register modifying instruction, the condition register data is transferred from the condition register rename buffer to the architected condition register, thereby permitting condition register modifying instructions to be dispatched, executed, and finished before the condition register is available to complete each condition register modifying instruction.

The above, as well as additional objects, features, and advantages of the present invention, will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
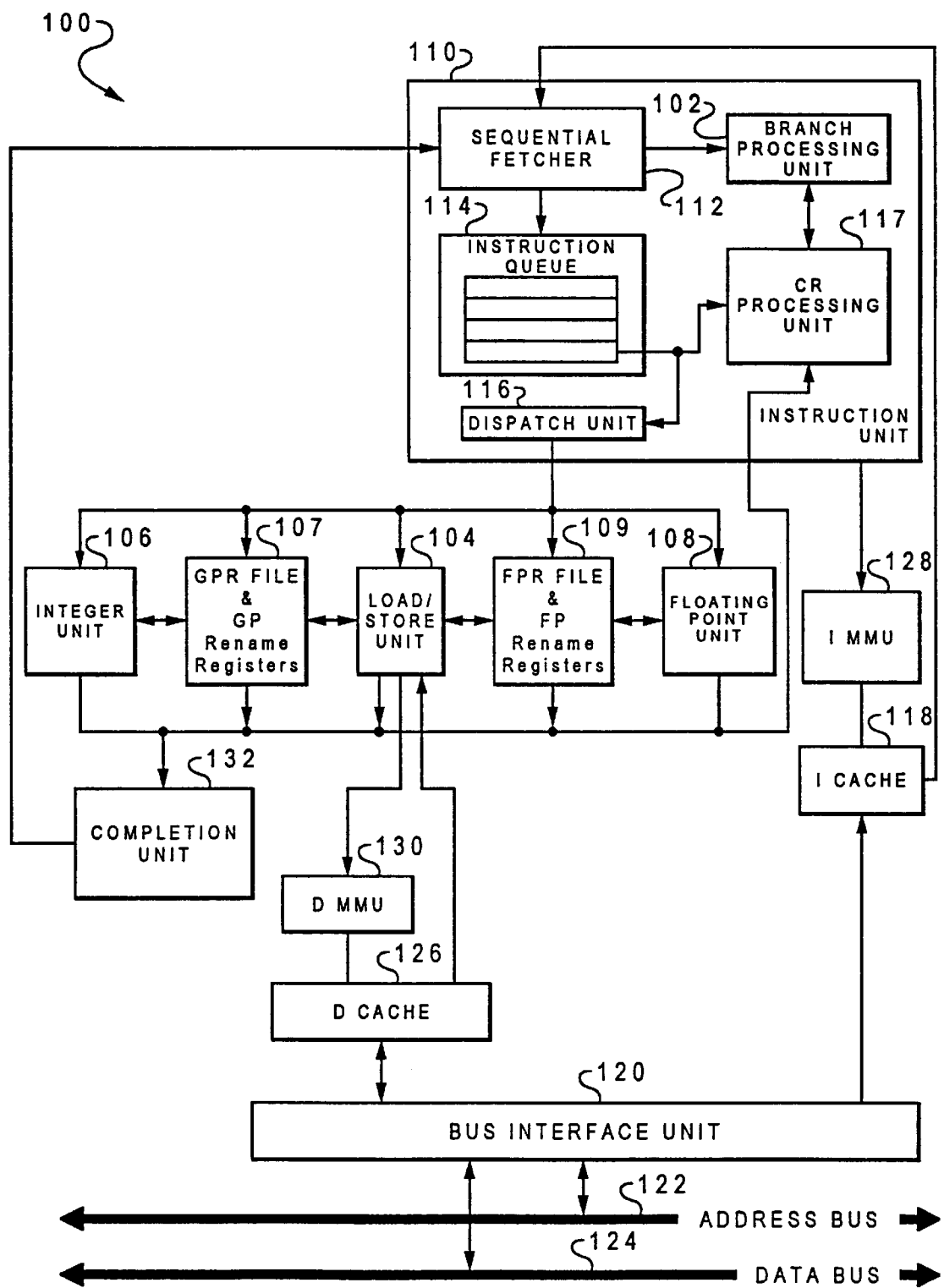
FIG. 1 depicts a superscalar data processing system in accordance with a preferred embodiment of the present invention.

With reference now to the figures and in particular with reference to FIG. 1, there is depicted a superscalar data processing system in accordance with the method and system of the present invention. A superscalar processor is one that issues multiple independent instructions into multiple execution pipelines allowing multiple instructions to execute in parallel. As illustrated in FIG. 1, superscalar data processing system 100 includes at least five independent execution units, and two register files. The independent execution units may include: branch processing unit (BPU) 102, load/store unit 104, integer unit 106, and floating-point unit 108. Register files in superscalar data processing system 100 include: general purpose register file (GPR) 107, for integer operands, and floating-point register file (FPR) 109, for single- or double-precision floating-point operands. Additionally, both GPR 107 and FPR 109 may include a set of rename registers, respectively. Such rename registers are used to store instruction results prior to their commitment to the architected register by the completion unit.

Instruction unit 110 contains sequential fetcher 112, instruction queue 114, dispatch unit 116, condition register processing unit 117, and branch processing unit 102. Instruction unit 110 determines the address of the next instruction to be fetched from instruction cache 118 based upon information received from sequential fetcher 112 and branch processing unit 102.

Sequential fetcher 112 fetches instructions from instruction cache 118 and loads such instructions into instruction queue 114. Branch instructions are identified by sequential fetcher 112, and forwarded to branch processing unit directly, bypassing instruction queue 114. Such a branch instruction is either executed and resolved—if the branch is unconditional or if the required conditions are available—or the branch is predicted. If the branch is predicted, instructions following the prediction are referred to as speculatively executed instructions.

Nonbranch instructions are issued from instruction queue 114, with a dispatch rate contingent on execution unit busy status, rename and completion buffer availability, and the serializing behavior of some instructions. Instruction dispatch is done in program order. BPU 102 uses static branch prediction on unresolved conditional branches to allow instruction unit 110 to fetch instructions from a predicted target instruction stream while a conditional branch is evaluated. Branch processing unit 102 folds out branch instructions for unconditional branches or conditional branches unaffected by instructions in progress in the execution pipeline.

Instruction queue 114 holds several instructions loaded by sequential fetcher 112. Sequential fetcher 112 continuously loads instructions to keep space available in instruction queue 114 filled. Instructions are dispatched to their respective execution units from dispatch unit 116. Dispatch unit 116 is typically designed to dispatch more than one instruction per cycle when conditions will permit. In operation, instructions are fetched from instruction cache 118 and placed in either instruction queue 114 or branch processing unit 102. Instructions entering instruction queue 114 are issued to the various execution units from instruction queue 114. Instruction queue 114 is the backbone of the master pipeline for superscalar data processing system 100, and may contain, for example, a six-entry queue. If while filling instruction queue 114, a request from sequential fetcher 112 "misses" in instruction cache 118, then arbitration for a memory access will begin.

Data cache 126 provides cache memory for load/store unit 104. Instruction memory management unit 128 and data memory management unit 130 support accesses to virtual memory and physical memory for both instructions and data, respectively. The memory management units perform address translations and determine whether a cache "hit" or "miss" has occurred. Bus interface unit 120 controls access to external address bus 122 and external data bus 124 by participating in bus arbitration.

Completion unit 132 provides a mechanism to track instructions from dispatch through execution, and then retire or "complete" instructions in program order. Completing an instruction implies the commitment of the results of the instruction execution to the architected registers. In-order completion insures the correct architectural state when the superscalar data processor must recover from a misspredicted branch, or any other exception or interrupt.

Figure 2:
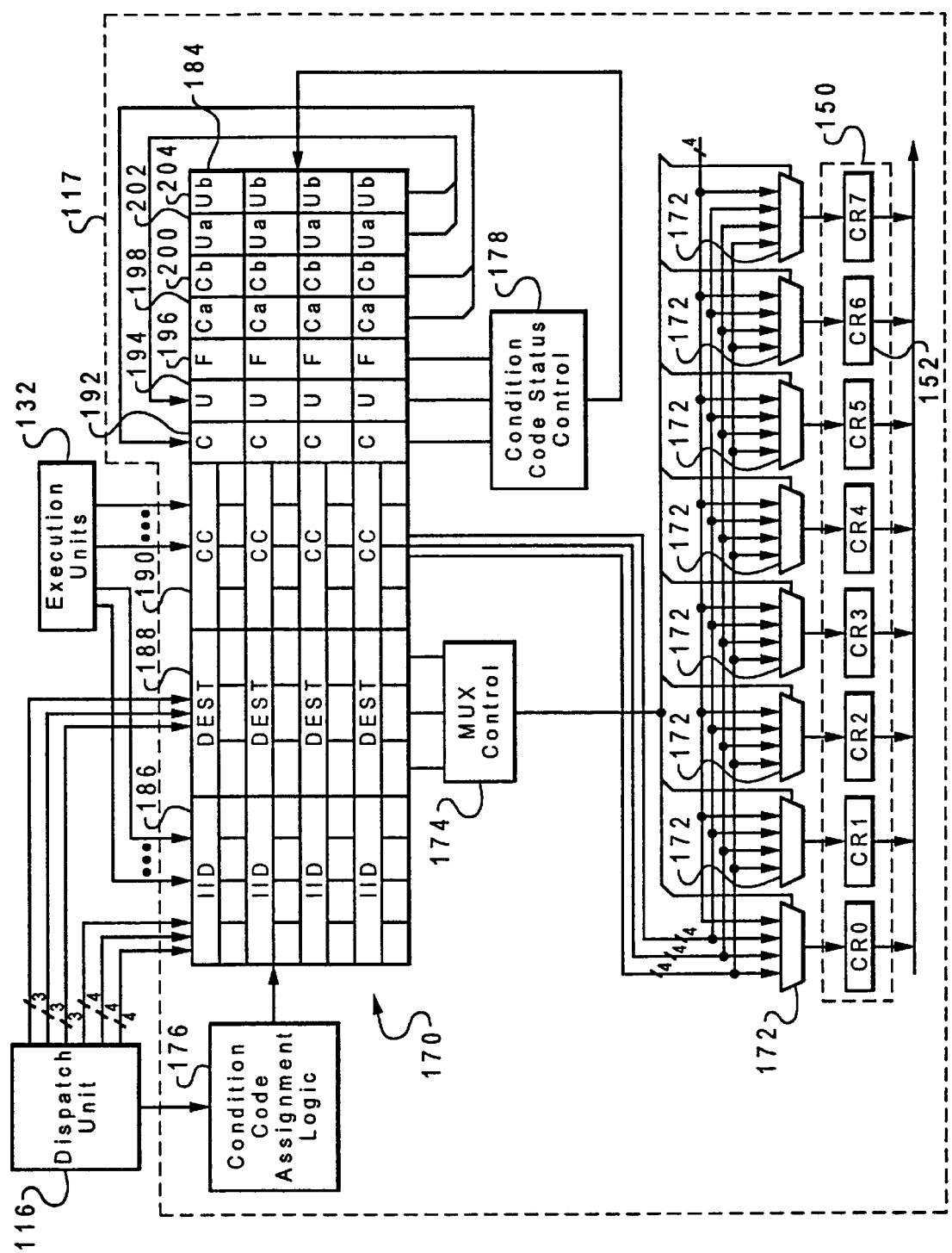
FIG. 2 is a high-level block diagram of a condition register processing unit in accordance with the method and system of the present invention.
Figure 3:
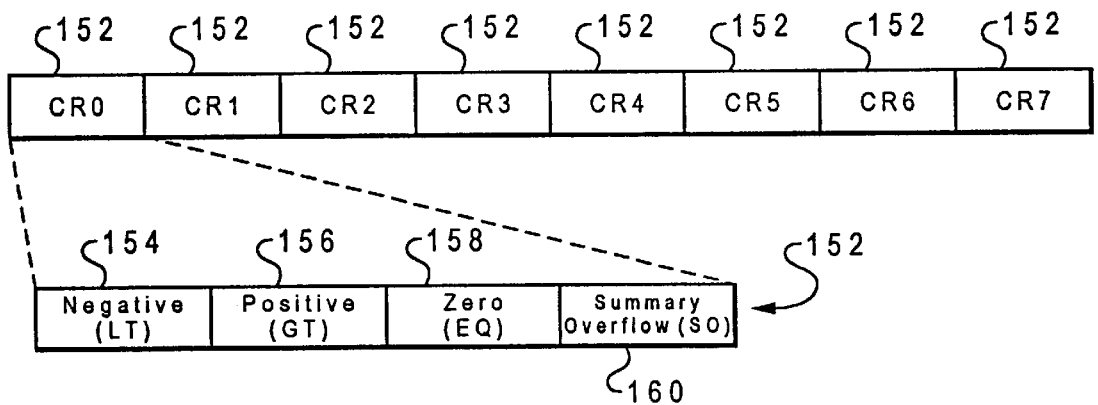
FIG. 3 depicts a condition register having condition register fields for storing condition register data, which is known in the prior art.

With reference now to FIG. 2, there is a depicted a high-level block diagram of a condition register processing unit in accordance with the method and system of the present invention. As illustrated, condition register processing unit 117 includes condition register 150, which includes a plurality of condition register fields 152. In this example, condition register 150 includes eight condition register fields 152, as illustrated in greater detail in FIG. 3. According to one embodiment of the present invention, each condition register field 152 includes four bits: a negative bit 154, which is set when the result of an operation is negative; a positive bit 156, which is set when the result of an operation is positive and not zero; a zero bit 158, which is set when the result of an operation is zero; and a summary overflow bit 160, which is set according to the summary overflow bit in the XER special purpose register.

Referring again to FIG. 2, condition register processing unit 117 also includes condition register renaming table 170. Condition register renaming table 170 is coupled to condition register 150 via multiplexers 172. Multiplexers 172 are controlled by multiplexer control 174, which is also coupled to condition renaming table 170.

Storage of information in condition renaming table 170 is controlled in part by condition code assignment logic 176 and condition code status control 178. External to condition register processing unit 117, information within condition register renaming table 170 is controlled and used by dispatch unit 116 and execution units 182. Execution units 182 represents execution units such as branch processing unit 102, integer unit 106, and floating-point execution unit 108, as illustrated in FIG. 1.

Condition register renaming table is comprised of condition register rename buffers 184. In FIG. 2, four condition register rename buffers are shown in condition register renaming table 170. Each condition register renaming buffer includes several fields, including instruction ID field 186, destination field 188, condition register data field 190, current bit 192, used bit 194, finish bit 196, Ca bit 198, Cb bit 200, Ua bit 202, and Ub bit 204.

In the embodiment shown in FIG. 2, instruction ID field 186 is a four-bit field for storing an instruction identifier, which uniquely identifies an associated instruction with respect to all other instructions executing within the data processing system. Such instruction IDs are assigned to instructions when the instructions are dispatched by dispatch unit 116. Such an instruction ID may be utilized to track instructions from dispatch through execution, and used to complete instructions in program order.

Destination field 188 is utilized in the example of FIG. 2 to store a three-bit data word that identifies one of condition register fields 152 that will be affected by the condition register and modifying instruction identified by the instruction ID stored in instruction ID field 186.

Condition register data field 190 is illustrated in FIG. 2 as a four-bit data word for storing condition registered data that reflects the result of the condition register modifying instruction identified by the instruction ID stored in instruction ID field 186. In the embodiment described herein, condition register data includes the four bits of data illustrated in FIG. 3: negative bit 154, positive bit 156, zero bit 158, and summary overflow bit 160.

Current bit (C bit) 192 is a single bit of data utilized to indicate that the instruction identified by the instruction ID in instruction ID field 186 is the latest dispatched instruction that modifies condition codes in condition register field 150 identified by destination data in destination field 188. For example, if two condition register modifying instructions that modify the same condition register field 150 have been assigned to two condition register rename buffers 184 in condition register renaming table 170, only the condition register rename buffer associated with the last dispatched condition register modifying instruction will have the current bit 192 set.

Used bit 194 is set to indicate that the condition register rename buffer has been assigned to a dispatched condition register modifying instruction that has not yet been "completed." That is, the condition register rename buffer is currently being used for an instruction that is in some stage of execution.

Finish bit 196 is utilized to indicate that the resulting condition register data has been loaded into condition register data field 190. Once finish bit 196 has been set, condition register data in condition register data field 190 may be utilized by an execution unit executing a condition register data dependent instruction to resolve a data dependency. A condition register data dependent instruction is one that relies upon valid condition register data from a previous instruction for its execution.

The Ca bit 198 and Cb bit 200 in condition register renaming buffer 184 are used in a manner similar to C bit 192. Like C bit 192, Ca bit 198 and Cb bit 200 are set to indicate that the associated condition register modifying instruction was the most recently dispatched instruction to modify the condition register field specified by data in destination field 188. However, Ca bit 198 is set when the associated instruction is dispatched following a speculative branch instruction, and Cb bit 200 is set for an instruction dispatched after another speculative branch if instructions following a first branch have not been completed.

Figure 4:
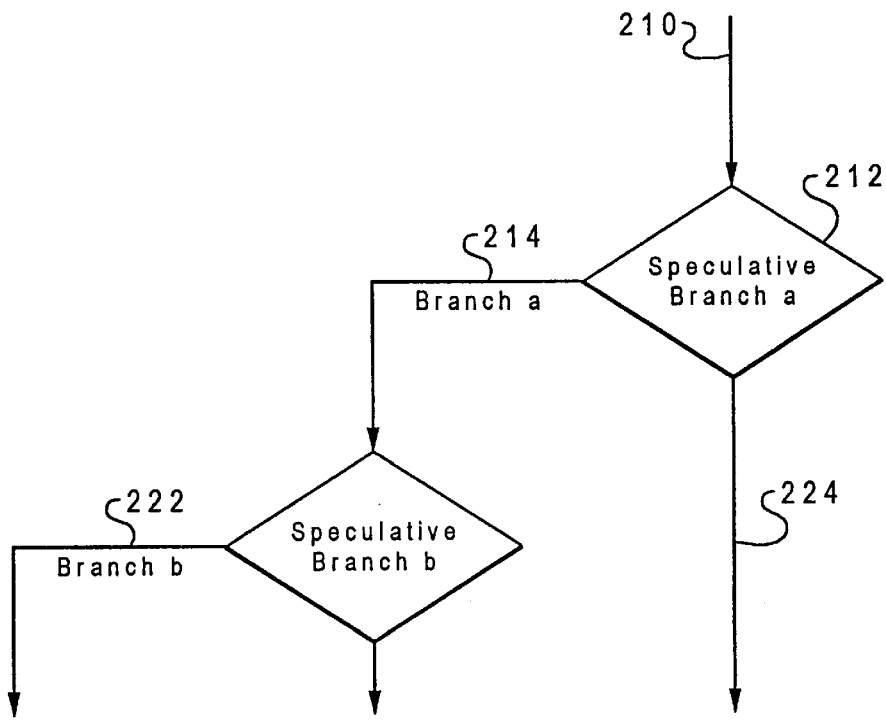
FIG. 4 is a flowchart that depicts levels of speculative instruction paths which may be executed in accordance with the method and system of the present invention.

For example, with reference to FIG. 4, instruction path 210 approaches speculative branch-a 212. If the data processing system speculatively decides to take instruction path 214, instructions in branch-a will be executed. As soon as a decision is made to speculatively execute instructions in branch-a 214, C-bits 192 for any instructions in path 210 are copied to Ca bits 198 in each respective condition register rename buffers 184. This step preserves a copy or record of C-bits 192 before speculative instructions in branch-a 214 are executed. If a decision is made in a first speculative branch-a 214 to speculatively execute instructions in a second speculative branch-b 222 before the completion of instructions in branch-a 214, C-bits 192 for instructions in branch-a 214 are copied into Cb bits 200 in each respective condition register rename buffer 184. This preserves a copy or record of C-bits 192 before instructions in branch-b 222 are executed.

If speculative branch-a 212 is resolved and it is determined that branch-a 214 instructions have been erroneously executed, condition register rename buffers 184 having Ca bits 198 set will have those Ca bits 198 copied back into C-bits 192 so that condition register renaming table 170 is restored to its condition immediately preceding branch-a 212. If, at this point, branch-b (a second branch) has also been taken, condition register rename buffers 184 used for instructions in branch-b 222 will be invalidated. Note that if conditions register rename buffers 184 associated with all instructions in path 210 are completed, Ca bits 198 are free to be used for recording C-bits 192 in condition register rename buffers 184 associated with instructions in branch-b 222 in response to a speculative branch in branch-b 222.

In a similar manner, Ua bit 202 and Ub bit 204 are utilized to store all current U bits 194 during the cycle that speculative execution begins in either an a-branch 214 or a b-branch 222 speculative instruction path. If it is later determined that either branch-a or branch-b was incorrectly executed, bits from either Ua bit 202 or Ub bit 204 are copied back into U bit 194. This puts the table back in a condition that existed before any instructions were speculatively executed. Additionally, if instructions have been completed in the non-speculative path, condition register rename buffers 184 associated with such instructions will not be restored because zeros that were reset in Ua bits 202 or Ub bits 204 at the time of completion will be copied back into U-bits 194 and the zero in U-bit 194 will indicate that the condition register rename buffer 184 is available.

Figure 5:
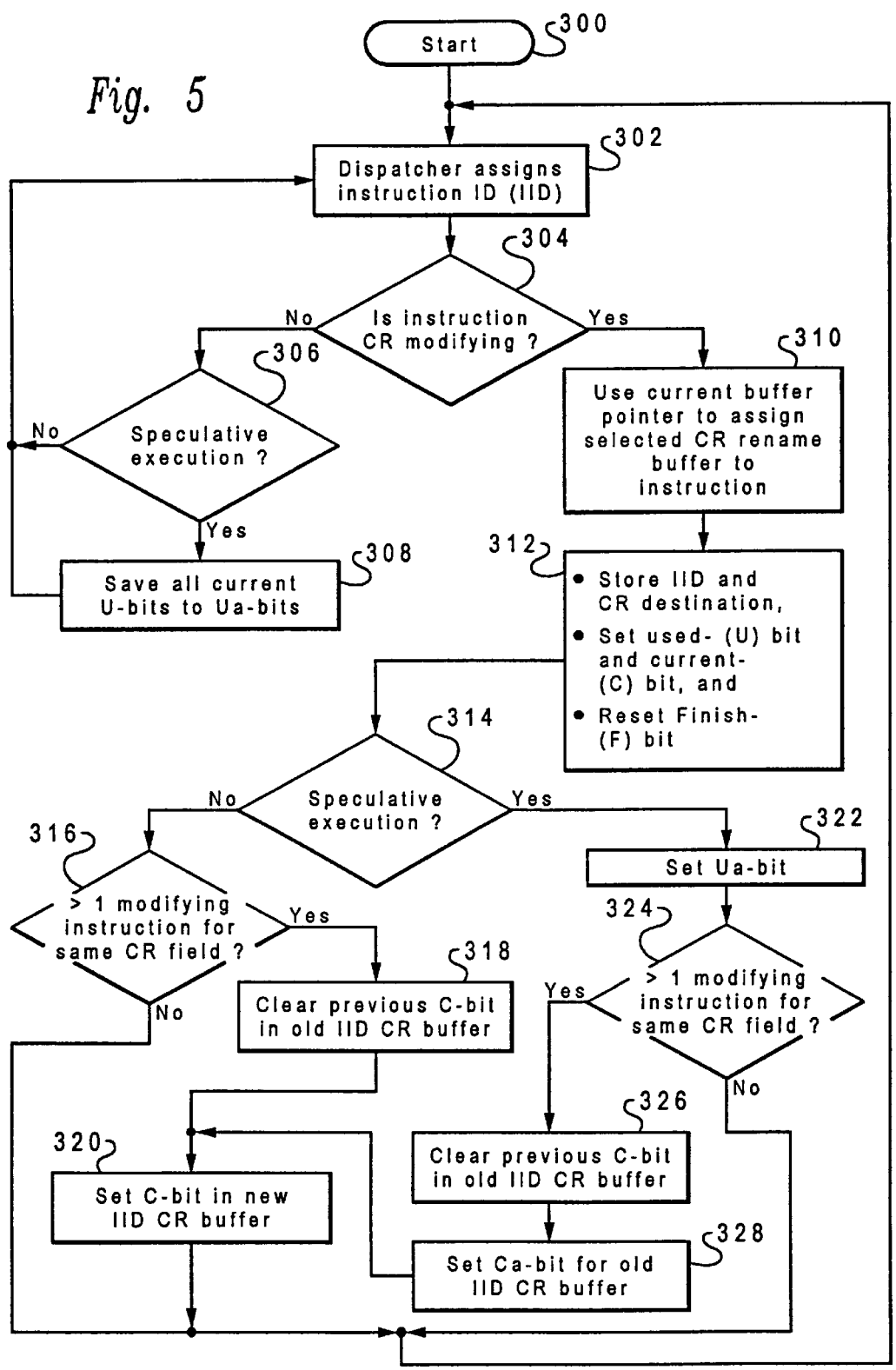
FIG. 5 depicts a high-level flowchart illustrating the process of entering data into condition register rename buffers in condition register renaming table in accordance with the method and system of the present invention.

With reference now to FIG. 5, there is depicted a high-level flowchart illustrating the process of entering data into condition register rename buffers in condition register renaming table in accordance with the method and system of the present invention. As illustrated, the process begins at block 300 and thereafter passes to block 302. As instructions within superscalar data processing system 100 (see FIG. 1) are dispatched, dispatcher 116 assigns instruction IDs (IIDs) to each dispatched instruction, as illustrated at block 302. Thereafter, the process determines whether or not the dispatched instruction is a condition register modifying instruction (also referred to as a CR modifying instruction) as depicted at block 304. If the dispatched instruction is not a CR-modifying instruction, the process determines whether or not the dispatched instruction will be speculatively executed, as illustrated at block 306. If the instruction is not being speculatively executed, the process passes to block 302, as illustrated by the no branch from block 306. If the instruction is being speculatively executed, the process saves all current U-bits 194 (i.e., all U-bits in condition register rename buffers that are currently associated with instructions that have not been completed) to Ua-bits 202 (see FIG. 2), as depicted at block 308. Thereafter, the process dispatches another instruction, as illustrated at block 302.

Referring again to block 304, if the dispatched instruction is a CR-modifying instruction, the process uses a current buffer pointer to assign a selected condition register rename buffer to the dispatched instruction, as depicted at block 310. Such a current buffer pointer may be maintained in condition code assignment logic 176 (see FIG. 2). In the embodiment discussed herein, the current buffer pointer points to the next available condition register rename buffer. Condition code assignment logic 176 may also provide information to dispatch unit 116 regarding the number of condition register rename buffers available in a particular cycle so that dispatch unit 116 may determine the number of CR-modifying instructions that may be dispatched in a single cycle.

Next, the process stores the instruction ID of the dispatched instruction and the condition register (CR) destination data in the instruction ID field 186 and destination field 188, respectively (see FIG. 2). The process also sets the U-bit 194 and the current bit 192, as illustrated at block 312. U-bit 194 indicates that the condition register rename buffer is currently being associated with a condition register modifying instruction that has not yet been "completed." C-bit 192 indicates that the associated condition register modifying instruction was the last CR-modifying instruction to modify a particular condition register field 150. Finally, the process resets finish-bit (F-bit) 196 to indicate that data in condition register data field 190 is not yet valid, and does not reflect the "finished" result of the associated CR-modifying instruction.

Next, the process determines whether or not the dispatched instruction is being speculatively executed, as depicted at block 314. If the instruction is not being speculatively executed, the process determines whether or not more than one CR-modifying instruction that modifies the same condition register field has been assigned to two different condition register rename buffers 184 in condition register renaming table 170, as illustrated at block 316. If more than one CR-modifying instruction that modifies the same condition register field has been assigned to different condition register rename buffers, the process clears C-bit 192 (see FIG. 2) in the condition register rename buffer having an older instruction ID, as depicted at block 318. Thereafter, the process sets C-bit 192 in the newly dispatched condition register rename buffer having a newer instruction ID, as illustrated at block 320. This concludes the process of entering data into condition register renaming table 170 as a result of dispatching a single nonspeculative instruction. If more than one instruction is dispatched in a single cycle (i.e., at one time), data is entered in the table as if the instructions were dispatched one-at-a-time and the process described in relation to FIG. 5 was followed. Once data has been entered into condition register renaming table 170, the process returns to block 302, and the process dispatches the next instruction.

Referring again to block 316, if there is not more than one CR modifying instruction that modifies the same condition register field in condition register renaming table 170, the process returns to block 302 to dispatch the next instruction, as depicted by the no branch from block 316.

With reference again to block 314, if the instruction is being speculatively executed, the process saves all U-bits in buffers associated with older CR-modifying instructions to respective Ua-bit locations 202, and the process sets U-bit 194 in the buffer for the newly dispatched instruction. Thus, the process assumes as it enters data in the table that the speculatively guessed branch, such as branch-a 214 in FIG. 4, will be the correct instruction branch. If it is determined not to be the correct instruction branch, U-bits 194 previously copied to Ua-bits 202 will be restored upon resolution of the speculative branch, such as speculative branch-a 212 in FIG. 4.

Thereafter, the process determines whether or not more than one CR-modifying instruction that modifies the same condition register field has been associated with two different condition register rename buffers in condition rename table 170, as illustrated at block 324. If only one CR-modifying instruction that modifies a particular condition register field is associated with a buffer in table 170, the process returns to block 302 via the no-branch from block 324, and another instruction is dispatched. However, if more than one CR-modifying instruction modifies the same condition register field 150, the process clears C-bit 192 associated with the buffer containing the older instruction ID, as depicted at block 326. Thereafter, the process sets Ca-bit 198 associated with the older instruction, as depicted at block 328. Next, the process sets C-bit 192 in the buffer containing the newer instruction ID, as illustrated at block 320. This completes the CR renaming table entry procedure when a speculatively executed instruction is dispatched.

Figure 6:
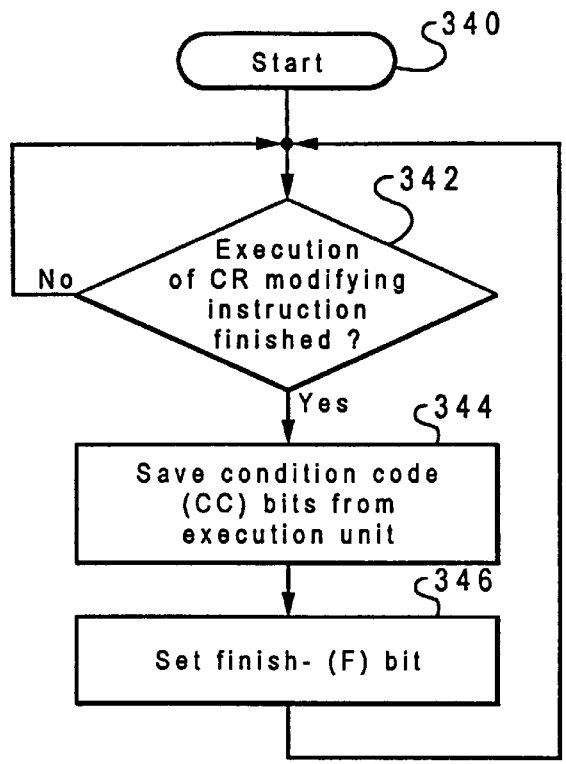
FIG. 6 depicts a high-level flowchart illustrating the process of entering condition code data into the condition register rename buffer according to the method and system of the present invention.

With reference now to FIG. 6, there is depicted a high-level flowchart illustrating the process of entering condition code data into the condition register rename buffer according to the method and system of the present invention. As illustrated, the process begins at block 340 and thereafter passes to block 342, wherein the process determines whether or not the execution of a CR-modifying instruction has "finished" in one of the execution units that executes CR-modifying instructions. If a CR-modifying instruction has not been finished, the process continues to wait for new condition code data, as illustrated by the no branch from block 342. If the execution of a CR-modifying instruction has finished, the process saves condition code bits received from the execution unit that finished the CR modifying instruction. The condition code bits may be saved in condition register data field 190, as depicted in FIG. 2. Such condition code bits, or condition register data, reflects the result of executing the CR-modifying instruction, as described above with reference to FIG. 3.

Next, the process sets the finish-bit (F-bit) 196 (see FIG. 2) to indicate that condition register data in condition register data field 190 is valid and available to resolve speculative branches or other condition register data dependent instructions in other execution units, as depicted at block 346. This completes the process of storing condition register data in condition register renaming table 170.

Figure 7:
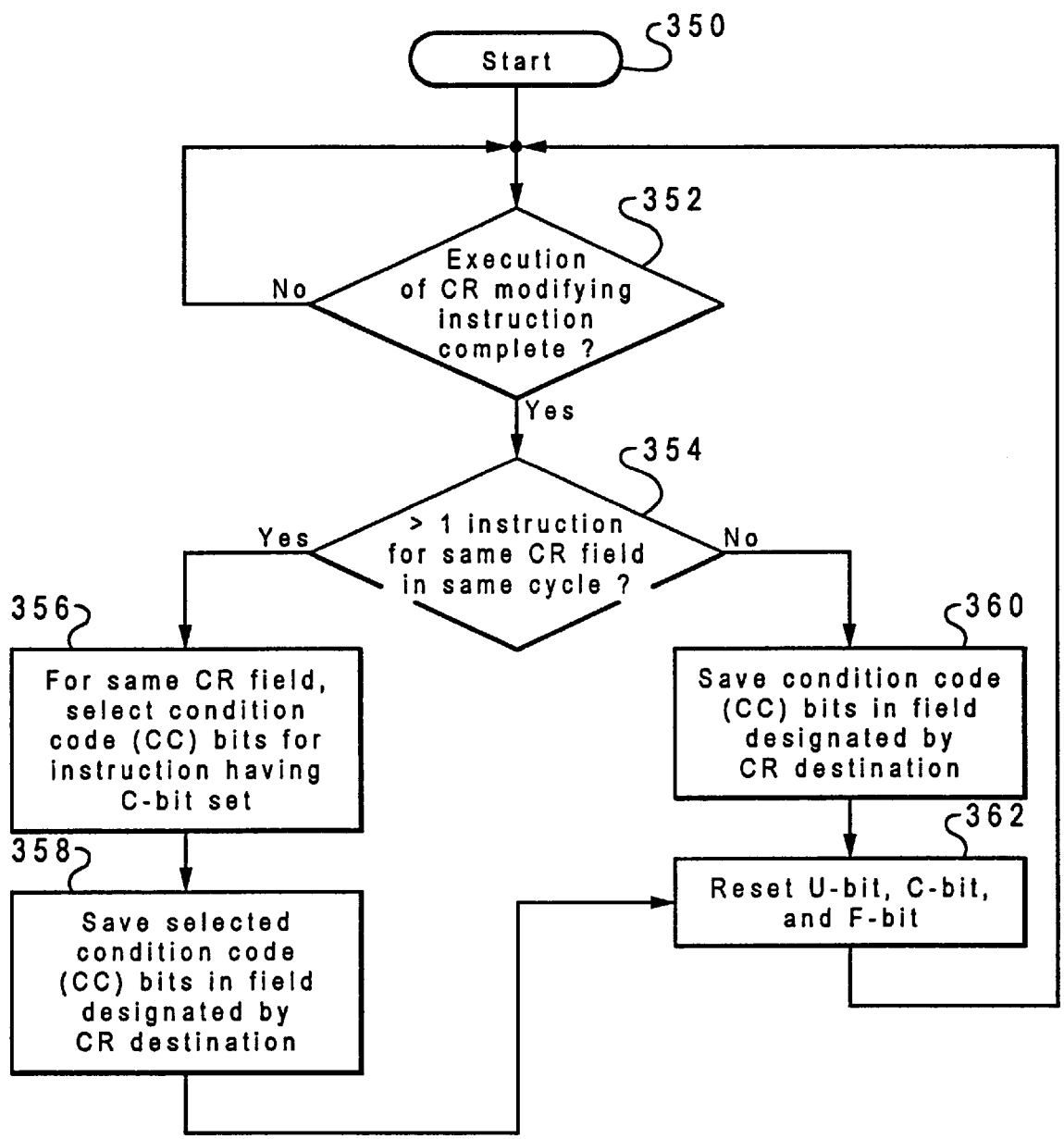
FIG. 7 depicts a high-level flowchart illustrating the process of completing condition register modifying instructions according to the method and system of the present invention.

With reference now to FIG. 7, there is depicted a high-level flowchart illustrating the process of "completing" condition register modifying instructions according to the method and system of the present invention. As illustrated, the process begins at block 350, and thereafter passes to block 352 wherein the process determines whether or not the execution of a CR modifying instruction is scheduled for completion, as illustrated at block 352. If a CR-modifying instruction is not scheduled for completion, the process waits, as illustrated by the no branch from block 352. If a CR modifying instruction is scheduled for completion, the process determines whether or not more than one CR-modifying instruction that modifies the same condition register field is scheduled for completion in the same cycle, as depicted at block 354.

If more than one instruction that modifies condition register field is scheduled for completion, the process selects the condition code data from the condition register rename buffer having C-bit 192 set, as illustrated at block 356. In this step, the process selects the latest condition register data for a particular condition register field that is represented in condition register renaming table 170. Next, the process saves the selected condition code data in field 152 in condition register 150 that is designated by data in destination field 188, as depicted at block 358. During this step, condition register data is transferred from the condition register rename buffer 184 to a designated field 152 in condition register 150.

With reference again to block 354, if not more than one instruction that modifies the same condition register field 152 is scheduled for completion in the same cycle, the process saves or transfers condition code data from condition register data field 190 to condition register field 152 designated by data in destination field 188, as illustrated at block 360. This transferring of condition register data may be accomplished through the use of Mux control 174 (see FIG. 2) that generates signals to control multiplexers 172 to route condition register data to the designated condition register field 152.

Finally, the process resets U-bit 194, C-bit 192, and F-bit 196 for each condition register rename buffer 184 that has transferred condition register data to a condition register field 152, as depicted at block 362. Thereafter, the process returns to block 352 to await scheduling of completion for additional-CR modifying instructions.

Figure 8:
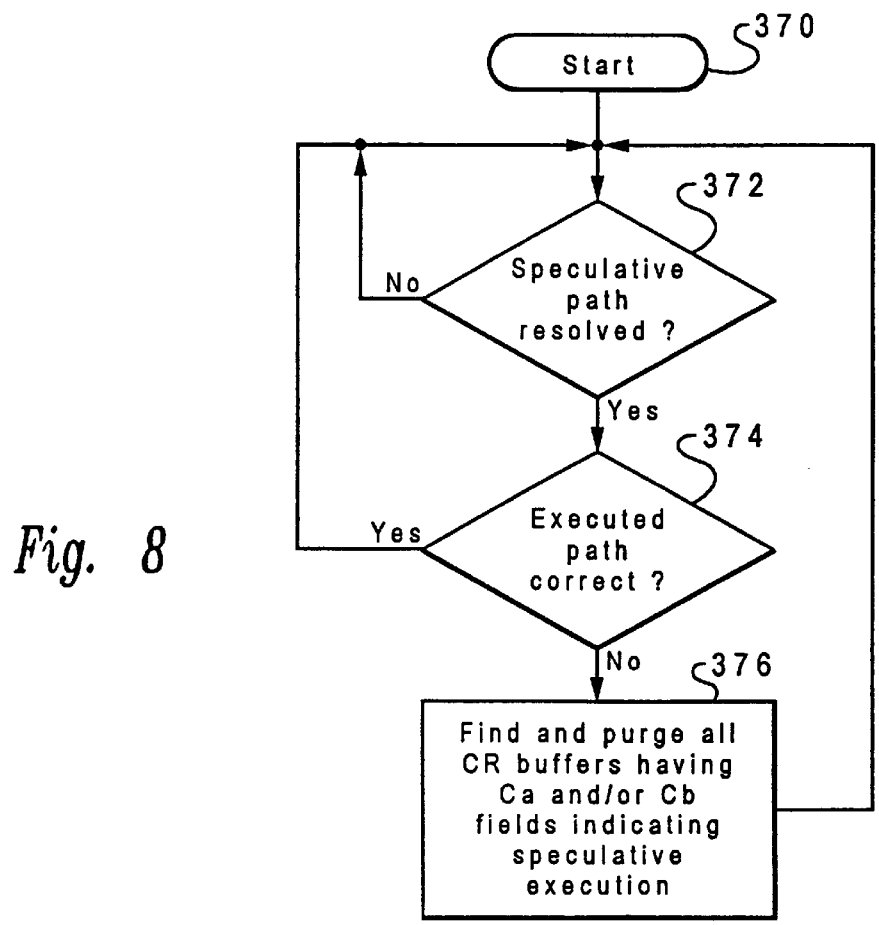
FIG. 8 depicts a high-level flowchart illustrating the process of purging or invalidating condition register rename buffers associated with speculatively executed instructions in a mispredicted instruction path according to the method and system of the present invention.

With reference now to FIG. 8, there is depicted a high-level flowchart illustrating the process of purging or invalidating condition register rename buffers associated with speculatively executed instructions in a misspredicted instruction path according to the method and system of the present invention. As illustrated, the process begins at block 370, and thereafter continues at block 372 wherein the process determines whether or not a speculatively executed path has been resolved. If a speculatively executed path has not been resolved, the process waits, as illustrated by the no branch from block 372. If a speculatively executed path has been resolved, the process determines whether or not the executed path is the correct path, as depicted at block 374. If the correct instruction path has been executed, the process returns to block 372 to wait for the next speculatively executed path to be resolved, as illustrated by the yes branch from block 374.

If the speculatively executed path was incorrectly executed, the process finds and purges or invalidates all condition register rename buffers having U-bits 194, or Ua- or Ub-bits 202–204, that indicate the associated CR-modifying instruction was dispatched during a misspredicted speculative execution path, as illustrated at block 376. In the embodiment described herein, Ca- and Cb-bits 189–200 and Ua- and Ub-bits 202–204 support recovery for two misspredicted instruction branches, as illustrated in FIG. 4. For example, if branch-a was misspredicted, the process clears all condition register buffers which do not have Ua-bit 202 set because all other condition register rename buffers are associated with instructions dispatched during misspredicted instruction branch a. Similarly, if branch-b was misspredicted, condition register rename buffers associated with condition register modifying instructions dispatched during misspredicted branch-b will be cleared. If both a- and b-branches were misspredicted, the condition register renaming table is restored to the condition that existed before instructions in either branch-a or branch-b were dispatched.

Figure 9:
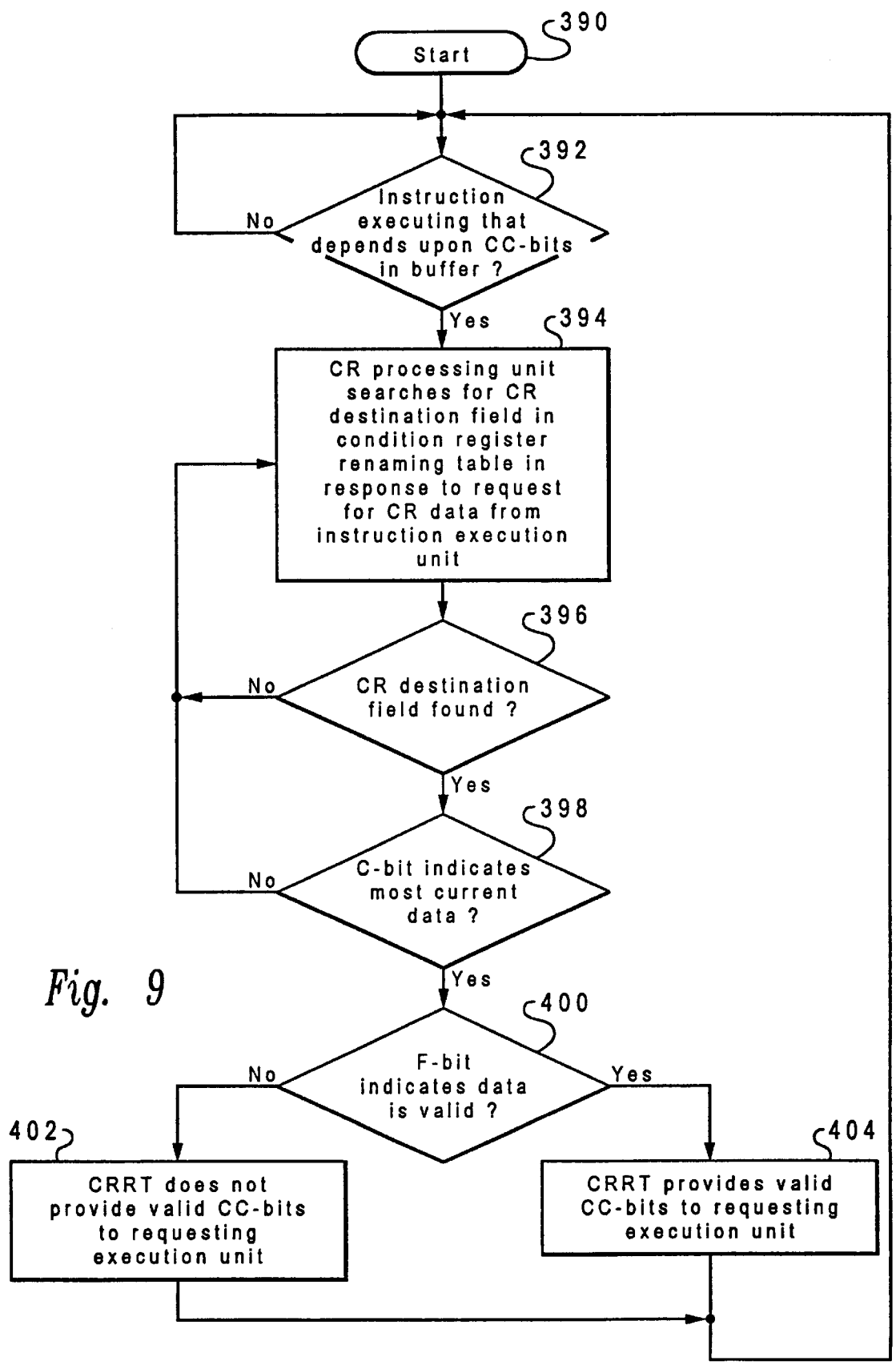
FIG. 9 depicts a high-level flowchart illustrating the process of utilizing condition register data stored in condition register renaming table according the method and system of the present invention.

And finally, with reference to FIG. 9, there is depicted a high-level flowchart illustrating the process of utilizing condition register data stored in condition register renaming table according the method and system of the present invention. As illustrated, the process begins at 390, and thereafter passes to 392 wherein the process determines whether or not an instruction is executing that depends upon condition registered data that is stored in a condition register rename buffer 184. Such an instruction may be referred. to as a "condition register data dependent instruction." If no condition register data dependent instructions are executing, the process waits, as illustrated by the no branch from block 392.

If a condition register data dependent instruction is executing, CR processing unit 117 (see FIG. 1) searches for a match between destination data in the condition register renaming table and a response to a request for desired condition register data from a particular instruction execution unit, as depicted at block 394. Next, the process determines whether the desired destination data is found in destination field 188 of condition renaming table 170, as depicted at block 396. If the desired destination data is not found in the table, the process continues searching CR renaming table 170, as illustrated by the no branch from block 396. If the appropriate destination data is matched, the process determines whether or not C-bit 192 is set in the buffer to indicate that the condition register data is the most current data for the specified condition register field, as illustrated at block 398. If C-bit 192 is not set, indicating that the condition register data for that particular destination is not the most current, the process continues to search condition register renaming table 170, as illustrated by the no branch from block 398.

If the C-bit indicates that the condition register data is the most current for the specified destination, the process determines whether or not F-bit 196 is set to indicate that the data in condition register field 190 is valid in that it reflects the result of a "finished" CR-modifying instruction, as illustrated at block 400. If F-bit 196 indicates that the condition register data is not valid, condition register rename table 170 is not able to provide valid condition code bits to the requesting execution unit, as depicted at block 402. However, if F-bit 196 indicates that the condition code data is valid, condition register renaming table 170 provides valid condition data to the requesting execution unit, as depicted at block 404. Such condition code data may be provided to an execution unit, such as branch processing unit 102 (see FIG. 1), to resolve a conditional branch instruction, or may be provided to some other execution unit to finish a condition register data dependent instruction.

The foregoing description of a preferred embodiment of the invention has been presented for the purpose of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method in a superscalar data processing system for temporarily buffering condition register data within said data processing system in response to execution of a condition register modifying instruction, wherein said data processing system includes a condition register grocessing unit having a condition register for storing condition register data, a condition register renaming table having a plurality of condition register rename buffers, wherein each of said condition register rename buffers includes an instruction ID field, a condition register data field and a current bit field, a plurality of execution units coupled to said condition register processing unit, a branch processing unit coupled to said condition register processing unit, and an instruction dispatcher coupled to said condition register processing unit for associating an instruction ID with each condition register modifying instruction and for simultaneously dispatching said plurality of condition register modifying instructions to said plurality of execution units, said method comprising the steps of:

in response to simultaneously dispatching said plurality of condition register modifying instructions to said plurality of execution units, associating a condition register rename buffer with each of said plurality of condition register modifying instructions and storing said instruction ID associated with each condition register modifying instruction in said instruction ID field of said associated condition register rename buffer;

executing each of said plurality of condition register modifying instructions within said plurality of execution units;

in response to execution of each of said plurality of condition register modifying instructions;

setting condition register data in said associated condition register rename buffer to reflect the result of said executed condition register modifying instruction;

setting a current bit within said current bit field within said associated condition register rename buffer; and indicating said condition register data within said associated condition register rename buffer is valid; and in response to completion of a plurality of said condition register modifying instructions, transferring said condition register data from a selected one of said condition register rename buffers to said condition register for use by said branch processing unit based upon a status of said current bit field and said instruction ID field.

2. The method according to claim 1 wherein said condition register renaming table includes a destination field for storing destination data that designates one of said plurality of condition register fields, and wherein said step of associating a condition register rename buffer with each of said plurality of condition register modifying instructions includes storing said destination data in said destination field of said associated condition register rename buffer.

3. The method according to claim 2 wherein said step of transferring said condition register data from a selected one of said condition register rename buffers to said condition register includes transferring said condition register data from said selected one of said condition register rename buffers to one of said plurality of fields in said condition register designated by said destination data in said destination field in said selected one of said condition register rename buffers.

4. The method according to claim 1 wherein said condition register renaming table includes a finish bit, and wherein said step of indicating said condition register data is valid includes setting said finish bit.

5. The method according to claim 1 wherein said step of executing said plurality of condition register modifying instructions within said plurality of execution units includes executing a floating-point add instruction within a floating-point execution unit.

6. The method according to claim 1 wherein said step of executing said plurality of condition register modifying instructions within said plurality of execution units includes executing an integer multiply instruction within a fixed-point execution unit.

7. The method according to claim 1 further including the steps of:

in response to execution of a condition register data dependent instruction having a dependency upon said condition register data in a selected condition register rename buffer that reflects the result of executing a condition register modifying instruction, searching said condition register renaming table for condition register data that reflects the result of executing said condition register modifying instruction; and if said condition register data is located within said particular condition register rename buffer, resolving said dependency utilizing said condition register data stored in said particular condition register rename buffer and finishing execution of said condition register data dependent instruction.

8. The method according to claim 1 wherein each of said condition register rename buffers includes a speculative execution bit for indicating said associated condition register modifying instruction as being speculatively executed, further including the step of invalidating said condition register data in said condition register rename buffer having said speculative execution bit indicating that said condition register data reflects the a speculatively executed instruction in a mispredicted instruction path.

9. The method according to claim 8 wherein each of said condition register rename buffers includes a used bit for indicating said condition register rename buffer is a valid buffer, and wherein said step of invalidating said condition register data in said condition register rename buffer having said speculative execution bit indicating that said condition register data reflects the result of a speculatively executed instruction in a mispredicted instruction path includes setting said used bit in said condition register rename buffer to indicate that said condition register data reflects the result of a speculatively executed instruction in a mispredicted instruction path.

10. A system for temporarily buffering condition register data within a superscalar data processing system in response to execution of a plurality of condition register modifying instructions, wherein said data processing system includes a condition register processing unit having a condition register for storing condition register data, a condition register renaming table having a plurality of condition register rename buffers, wherein each of said condition register rename buffers includes an instruction ID field, a condition register data field and a current bit field, a plurality of execution units coupled to said condition register processing unit, a branch processmg unit coupled to said condition register processing unit, and an instruction dispatcher coupled to said condition resister processin -unit for associating an instruction ID with each condition register modifying instruction and for simultaneously dispatching said plurality of condition register modifying instructions to said plurality of execution units, said system comprising:

means for associating a condition register rename buffer with each of said plurality of condition register modifying instructions and storing said instruction ID associated with each said condition register modifying instructions in said instruction ID field of said condition register rename buffer in response to simultaneous dispatching of said plurality of condition register modifying instructions to said plurality of execution units;

means for executing each of said condition register modifying instructions within said plurality of execution units;

means for setting condition register data in an associated condition register rename buffer to reflect the result of execution of a condition register modifying instruction in response to execution of each of said plurality of condition register modifying instructions;

means for setting a current bit within said current bit field within said associated condition register rename buffer;

means for indicating said condition register data within said associated condition register rename buffers is valid;

means for transferring said condition register data from a selected one of said condition register rename buffers to said condition register for use by said branch processing unit based upon a status of said current bit field and said instruction ID field in response to completion of a plurality of said condition register modifying instructions.

* * * * *

UNITED STATES PATENT AND TRADEMARK OFFICE
CERTIFICATE OF CORRECTION

PATENT NO. : 5,974,240
DATED : Oct. 26, 1999
INVENTOR(S) : Chan

It is certified that error appears in the above-identified patent and that said Letters Patent are hereby corrected as shown below:

In Col. 11, Claim 1, line 30, please delete "grocessing" and replace it with --processing --.

In Col. 13, Claim 10, line 20, please delete "processin -unit" and insert --processing unit --.

Signed and Sealed this

First Day of May, 2001

Attest:

NICHOLAS P. GODICI

*Attesting Officer*     *Acting Director of the United States Patent and Trademark Office*